(12) United States Patent
McDermid (10) Patent No.: US 6,925,398 B2
(45) Date of Patent: Aug. 2, 2005

(54) WATER MEASUREMENT APPARATUS AND METHODS

(75) Inventor: John McDermid, Loveland, CO (US)

(73) Assignee: Colorado vNet, LLC, Loveland, CO (US)

( * ) Notice: Subject to any disclaimer, the term of this patent is extended or adjusted under 35 U.S.C. 154(b) by 0 days.

(21) Appl. No.: 10/777,525

(22) Filed: Feb. 11, 2004

(65) Prior Publication Data

US 2005/0021249 A1 Jan. 27, 2005

Related U.S. Application Data

(60) Provisional application No. 60/485,591, filed on Jul. 7, 2003.

(51) Int. Cl.[7] .................................................. G01L 7/00
(52) U.S. Cl. .............................. 702/55; 702/45; 702/50; 702/100
(58) Field of Search .............................. 702/45, 50, 55, 702/100, 187; 73/299, 301, 302, 290 R (56) References Cited

U.S. PATENT DOCUMENTS

| | | | |
|---|---|---|---|
| 3,973,181 A | * | 8/1976 | Calvert ........................ 324/355 |
| 4,347,478 A | | 8/1982 | Heerens et al. |
| 4,347,740 A | | 9/1982 | Townsend |
| 4,347,741 A | | 9/1982 | Geiger |
| 4,373,389 A | | 2/1983 | Decker |
| 4,418,565 A | | 12/1983 | St. John |
| 4,418,569 A | | 12/1983 | Kuhnel |
| 4,449,405 A | | 5/1984 | Franz et al. |
| 4,479,116 A | | 10/1984 | Kobayashi |
| 4,553,434 A | | 11/1985 | Spaargaren |
| 4,818,492 A | | 4/1989 | Shimizu |
| 4,977,786 A | | 12/1990 | Davis |
| 5,001,596 A | | 3/1991 | Hart |
| 5,017,909 A | | 5/1991 | Goekler |

(Continued)

OTHER PUBLICATIONS

"Introducing the Next Generation of Home Control Systems", 4 pgs, Advanced Control Technologies. Inc . . . Indianapolis. IN. Availabe at www.act-solutions.com at least Jul. 2004.

Internet Presentation, "Zwave: the wireless language", 18 pgs. Available at www.act-solutions.com at least Jul. 2004.

Adams Jon, "What you Should Know About the Zigbee Alliance" Sensors Expo Workshop, Sep. 24, 2003, Anaheim Convention Center. Anaheim, CA (original Authoriship 2002); 139 pgs.

McDermid, John; "Structural Test: Applying the 1149.4 Architecture" Presented at the First Official IEEE 1149.4 Tutorial In Palo Alto, CA, May 3–4 2002, 87 pages.

(Continued)

*Primary Examiner*—Bryan Bui
(74) *Attorney, Agent, or Firm*—Trenner Law Firm, LLC (57) ABSTRACT

Water measurement apparatus and methods of operation. An exemplary implementation of water measurement apparatus comprises a measurement circuit outputting a voltage. A processor is operatively associated with the measurement circuit to receive the voltage and determine a capacitance value proportional to a water level. Computer readable program code is provided in computer readable storage and executable by the processor. The computer readable program code includes program code for determining the water level based on the capacitance value. Water measurement apparatus may also be implemented in an auto-network of water measurement stations.

35 Claims, 8 Drawing Sheets

U.S. PATENT DOCUMENTS

| | | | |
|---|---|---|---|
| 5,042,299 A | 8/1991 | Wells | |
| 5,052,223 A | 10/1991 | Renault et al. | |
| 5,083,470 A | 1/1992 | Davis et al. | |
| 5,097,703 A | 3/1992 | Peter | |
| 5,103,368 A | 4/1992 | Hart | |
| 5,145,323 A | 9/1992 | Farr | |
| 5,182,545 A | 1/1993 | Goekler et al. | |
| 5,238,369 A | 8/1993 | Farr | |
| 5,289,496 A | 2/1994 | Nakagawa et al. | |
| 5,343,084 A | 8/1994 | Gens | |
| 5,365,783 A * | 11/1994 | Zweifel | 73/304 C |
| 5,400,651 A * | 3/1995 | Welch | 73/290 R |
| 5,437,184 A | 8/1995 | Shillady | |
| 5,477,727 A | 12/1995 | Koga | |
| 5,722,290 A | 3/1998 | Kronberg | |
| 5,765,434 A | 6/1998 | Harbaugh | |
| 5,929,754 A | 7/1999 | Park et al. | |
| 6,016,697 A | 1/2000 | McCulloch et al. | |
| 6,020,825 A | 2/2000 | Chansky et al. | |
| 6,073,488 A | 6/2000 | Byatt et al. | |
| 6,164,132 A | 12/2000 | Matulek | |
| 6,178,818 B1 | 1/2001 | Plochinger | |
| 6,295,869 B1 | 10/2001 | Delatte | |
| 6,297,733 B1 | 10/2001 | Park | |
| 6,310,440 B1 | 10/2001 | Lansing et al. | |
| 6,318,172 B1 | 11/2001 | Byatt et al. | |
| 6,405,590 B1 | 6/2002 | Byatt et al. | |
| 6,424,099 B1 | 7/2002 | Kirkpatrick et al. | |
| 6,490,919 B2 * | 12/2002 | Bilinski et al. | 73/299 |
| 6,490,920 B1 | 12/2002 | Netzer | |
| 6,539,797 B2 | 4/2003 | Livingston et al. | |
| 6,557,062 B1 | 4/2003 | Shaler et al. | |
| 6,563,328 B1 | 5/2003 | Lenormand et al. | |

OTHER PUBLICATIONS

Cron, Adam; "Introduction to Boundry–Scan" Presented at the First Official IEEE 1149.4 Tutorial In Palo Alto, CA, May 3–4, 2002, 64 pages.

Sunter, Stephen; "System Test Methods" Presented at the First Official IEEE 1149.4 Tutorial in Palo Alto, CA, May 3–4, 2002, 54 pages.

Soma, Mani; "Architecture and Designs" Presented at the First Official IEEE 1149.4 Tutorial in Palo Alto, CA, May 3–4, 2002, 75 pages.

Adams, Jon; "What You Should Know about Zigbee Alliance" Sensors Expo Workshop Sep. 24, 2003 Anaheim Convention Center, Anaheim CA; (original Authorship 2002); 139 pages.

* cited by examiner

WATER MEASUREMENT APPARATUS AND METHODS

RELATED APPLICATION

This application claims priority to co-owned U.S. Provisional Patent Application Ser. No. 60/485,591 for "WATER MEASUREMENT APPARATUS AND METHODS" of John McDermid, filed Jul. 7, 2003, hereby incorporated herein for all that it discloses.

TECHNICAL FIELD

This invention relates generally to water measurement, and more particularly to water measurement apparatus and methods.

BACKGROUND

Water management is increasingly important as water supplies continue to be a limited resource for municipal, agricultural, and recreational purposes. Quantifying water supplies remains at the core of water management. However, quantifying water supplies often requires somebody visit the reservoirs and/or feeder streams in the water supply system and physically measure the water level. Of course this can be a time consuming process, particularly when the water supplies are spread out over a large geographic area, or in rough terrain. The water level may vary substantially between visits, making effective water management more difficult.

Accordingly, a number of water measurement devices are available to automatically measure and record water levels. One such device includes a floatation device slidably mounted around a pipe in the water. Fluctuations in the water level cause the floatation device to move up and down along the length of the pipe. The floatation device is connected to a strip chart recorder which produces markings that correspond to the water level indicated by the floatation device. Over time, however, the pipe may become corroded and impair movement of the floatation device. In addition, floatation devices are susceptible to damage and may need to be replaced. A chart house is also needed to protect the strip chart recorder from the environment (e.g., rain, snow, and wind). Furthermore, somebody still needs to visit the chart house periodically to retrieve the strip chart recordings and replace the ink cartridges and strip chart paper.

Ultrasonic measurement devices are also available. However, stray reflections increase the signal noise and decrease the reliability of the reading. Ultrasonic measurement devices depend on the velocity of sound and therefore are also sensitive to air temperature, humidity, and altitude. Measurement devices are also available that use microwaves. However, the electrical power requirements of these devices limit their use to areas with suitable power sources. Other devices may produce inaccurate measurements if the effects of water temperature and conduction (salinity) are not addressed.

SUMMARY

An exemplary implementation of a water measurement apparatus comprises a measurement circuit outputting a voltage. A processor is operatively associated with the measurement circuit to receive the voltage and determine a capacitance value proportional to a water level. Computer readable program code is provided in computer readable storage and executable by the processor. The computer readable program code includes program code for determining the water level based on the capacitance value.

An exemplary implementation of an auto-network of water measurement stations comprises at least a first and second water measurement station. A capacitive water measurement device at the first water measurement station determines a water level from a capacitance value based on a measured voltage. A transmitter at the first water measurement station is operatively associated with a receiver at the second water measurement station. The transmitter delivers water measurement data including at least the water level to the receiver at the second measurement station.

An exemplary method comprises: measuring a voltage between an inner conductor and an outer conductor, separating a real component from an imaginary component of the measured voltage, converting the measured voltage to a capacitance value using the real and imaginary component of the measured voltage, and determining the water level based on the capacitance value.

DETAILED DESCRIPTION

Described herein are capacitive water measurement apparatus and methods to mitigate the effects of water salinity and the change in dielectric constant with temperature. Water measurement apparatus can be provided at low cost, is readily installed, and requires minimum maintenance. In addition, water measurement apparatus has low power requirements for operation. Water measurement apparatus may be implemented in an auto-networking environment to remotely transmit water measurement data (e.g., water level and corresponding time of the measurements) to a technician or other user. The water measurement apparatus may be implemented as a solid state device with no moving parts, eliminating mechanical failures, and is not readily corroded by water hardness. This and other implementations are described in more detail below with reference to the figures.

Implementations of the water measurement apparatus are accurate to at least ±0.25% accuracy for measurements of 0 to 4 ft (i.e., ±0.01 ft, ±0.12 in) and have a resolution of at least 0.01 ft (0.12 in). In addition, implementations of the water measurement apparatus are insensitive to air temperature, water temperature, water salinity, and residual deposits (reducing the need for regular cleaning).

Data can be gathered on-site by read it directly from an optional LCD, or remotely by automatically transmitting data to a remote base station (e.g., accessible via the Internet). In addition, self-testing diagnostics may also be provided and may be implemented to remotely alert a user for maintenance or service, reducing the need for routing maintenance trips. The circuitry may also be field-programmable via RF commands.

Figure 1:
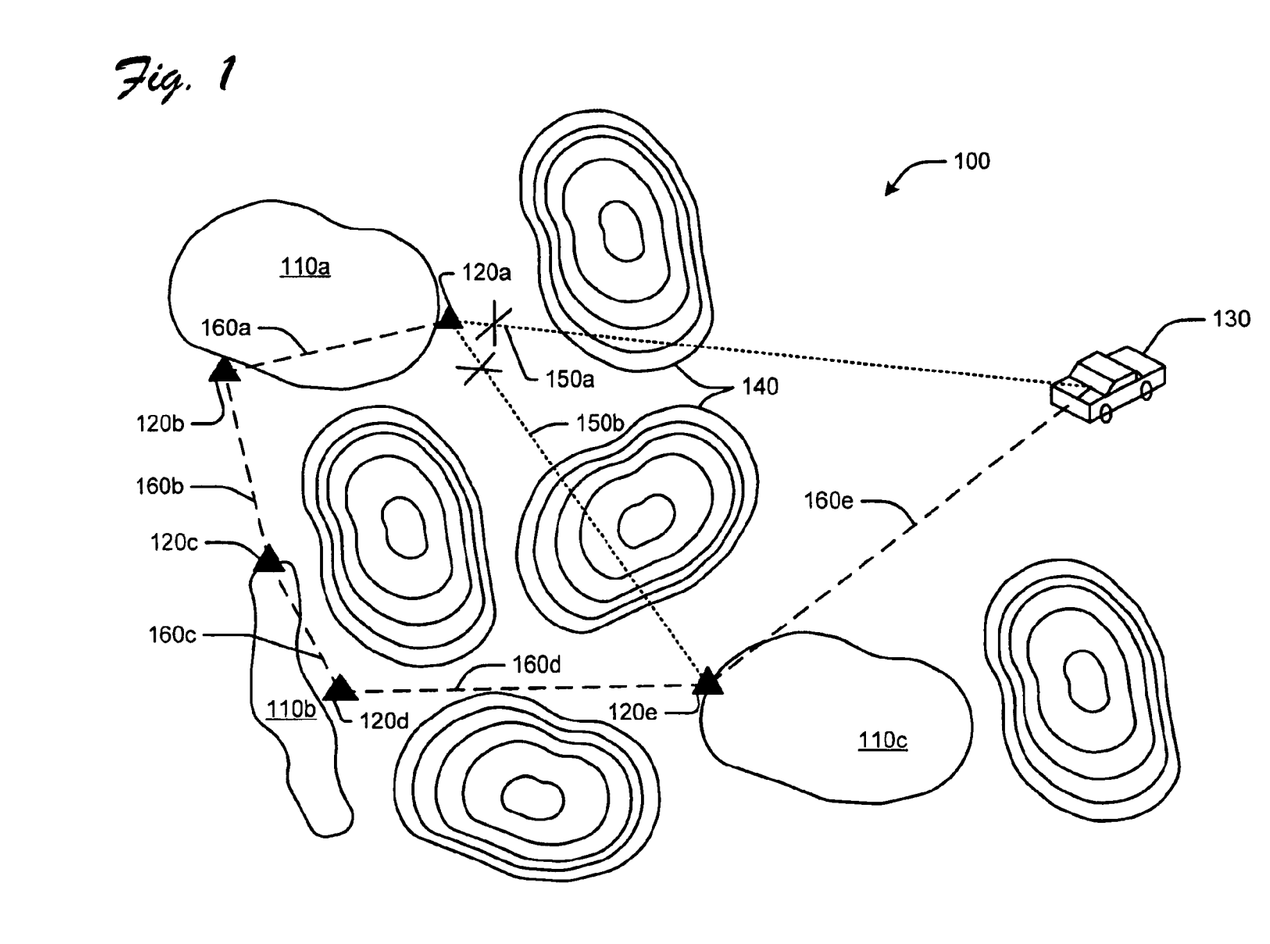
FIG. 1 is a high-level schematic diagram illustrating an exemplary implementation to auto-network a plurality of water measurement apparatus.

Exemplary Auto-Network:

FIG. 1 is high-level schematic diagram illustrating an exemplary implementation to auto-network a plurality of water measurement apparatus. The auto-network may be implemented as a "call, talk, and hang-up" model. Data is forwarded in an optimal or near optimal path with some data being sent directly to an endpoint and other data passing through other measurement stations. Data can also be passed delivered to an accumulation point and modified (e.g., sending height, flow or volume data). The auto-network may also be auto-configured, so that if a gage is station is within a predetermined distance of another station, it is detected and added to the auto-network.

A water storage system 100 may include one or more water supplies 110a, 110b, 110c (also referred to generally by reference 110), such as, e.g., reservoirs, rivers, ditches, and/or streams. A plurality of stations 120a, 120b, 120c, 120d, 120e (also referred to generally by reference 120) may implement the water measurement apparatus, discussed in more detail herein, to record water levels of the water supplies 110.

One or more technicians (illustrated by vehicle 130) may be deployed to the stations 120 at various times to retrieve the water level data. In exemplary implementations, the recorded water levels are remotely transmitted as a data signal to the technician (e.g., to a laptop, PDA or other electronic device) without the technician having to visit each of the stations 120 individually. Such an implementation may be used, e.g., if the water storage system 100 is spread out over a large geographic area, or where the terrain is such that the technician cannot readily visit each of the stations 120 on a regular or semi-regular basis.

The stations may be auto-networked. Such an implementation may be used to transmit the recorded water level data to the technician if barriers 140, such as, e.g., mountains and/or buildings, exist in and around the water storage system 100 that block the data signal. A blocked data signal is illustrated in FIG. 1 with an "X" through signal path 150a, 150b.

Instead, the data signals are transmitted to other stations 120 in the auto-network using spread spectrum/frequency hopping to auto correct for RF congestion. For purposes of illustration, station 120a may transmit a data signal (e.g., including water level data for station 120a) to a technician at vehicle 130 via stations 120b–e over data path 160a–e. For example, station 120b may receive the data signal from station 120a and retransmit the data signal to station 120c, and so forth. Optionally, one or more of the stations 120b–e may include additional data in the data signal (e.g., water measurement data collected at these stations). Alternatively, communication can occur simultaneously between different stations.

Figure 2:
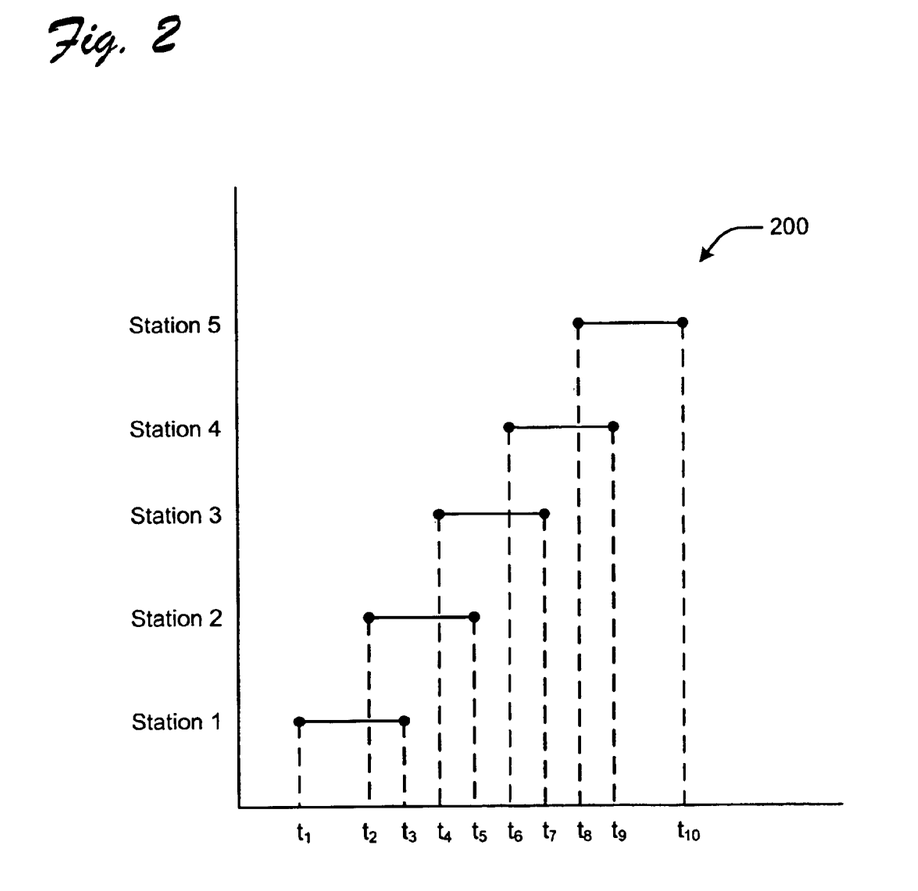
FIG. 2 is a graphical representation of a timing chart for operation of a water measurement apparatus in an exemplary auto-network.

FIG. 2 is a graphical representation of a timing chart 200 for operation of an exemplary auto-network. According to this implementation, the stations are in an active state to perform measurement and transmission operations, and are otherwise in an inactive state to reduce power consumption.

The timing chart 200 shows active states for stations 1–5 (e.g., stations 120a–e in FIG. 1). For purposes of illustration, Station 1 is in an active state from time $t_1$ to $t_3$, and is otherwise in an inactive state. During time $t_1$ to $t_3$, Station 1 makes a water level measurement and records it as a data signal. Transmission occurs during an overlap in the operation of Station 1 and Station 2. For example, in FIG. 2 transmission from Station 1 to Station 2 occurs on or after time $t_2$ when Station 2 becomes active, and prior to Station 1 becoming inactive at $t_3$.

In an exemplary implementation, the stations may be inactive or in a "sleep mode" every 1 to 2 seconds, and only need to be active during water level readings (e.g., <100 msec) and transmission operations (e.g., 15 msec), increasing the battery life and reducing maintenance. In other implementations, a plurality of water level measurements may be stored in memory and transmitted together. According to such an implementation, the active states of the stations do not have to overlap except during transmission from one station to another.

Figure 3A:
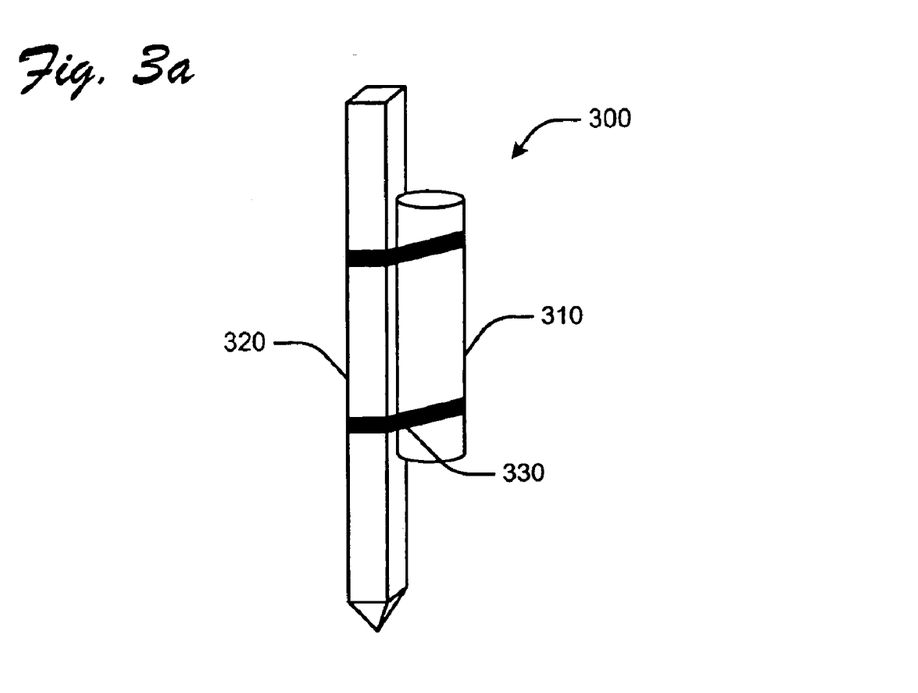
FIG. 3a is a perspective view of an exemplary water measurement apparatus as it may be installed on a post.
Figure 3B:
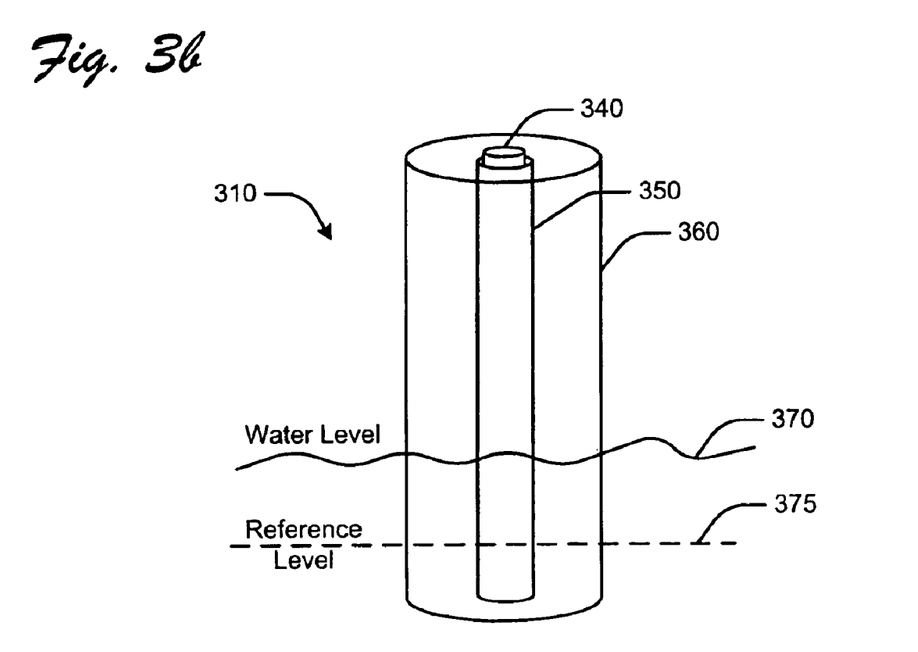
FIG. 3b is a diagrammatic illustration of an exemplary water measurement apparatus.

Exemplary Water Measurement Apparatus:

FIG. 3a is a perspective view of an exemplary water measurement apparatus 300. Water measurement apparatus includes a measurement gage 310 that may be readily installed by attaching it to a post 320 (e.g., a T-post), e.g., using hose clamps or cable clamps 330 or other suitable fasteners. The post 320 may be driven into the ground so that the measurement gage 310 is in the water (e.g., as illustrated in FIG. 3b). Measurement gage 310 can be readily positioned up or down along the post 320 and rotated (e.g., to aim a directional antenna for an RF link).

Water measurement apparatus 300 may be located upstream from a weir and used to determine volumetric water flow (e.g., measured in cubic feet per second, CFS). Water law often refers to water in terms of acre feet (AF) available to users. A water manager may be obligated to deliver water (measured in CFS) for a defined period of time (often 24 hours).

Having said this, it is also noted that water measurement apparatus 300 does not need to be implemented with a weir. For example, the water measurement apparatus 300 may be implemented as a staff gage. Reservoir capacities may be predetermined and calibrated against the staff gage. The water height measured by the staff gage can be used to determine the stored water capacity (e.g., in AF) in the reservoir. With this data available at the beginning of the water season, the shareholders can determine in advance how much water they should expect for the season.

Measurement gage 310 is shown according to an exemplary implementation in more detail in FIG. 3b. Measurement gage 310 may be configured as co-axial cylinders, although other geometries are also possible. In one such implementation, measurement gage 310 includes an inner conductor 340 surrounded by insulating sheath 350, and an outer conductor 360. An optional opening (not shown) may be formed in the measurement gage 310 (e.g., in the top surface of the outer conductor) to where damping is a concern. The size of the opening may be increased for a faster response to changes in water height.

As water fills the region between the insulating sheath 350 and the outer conductor 360, the capacitance between the inner conductor 340 and outer conductor 360 increases because water has a significantly higher dielectric constant than air. The increase in capacitance is proportional to the water height 370 in the measurement gage 310. The reference (or zero) level 375 of the water produces a reference level of capacitance. When this capacitance is determined and subtracted from the measured capacitance (and the capacitance per unit of height is known), the water height can be computed.

In an exemplary implementation, the insulating sheath 350 is chosen for its lack of conduction current (i.e., it is a good insulator). Suitable materials for the insulation sheath may include, but are not limited to Teflon, PVC, or other insulating and low water-absorption materials (e.g., plastics). The resistive component of the insulating sheath (i.e., part of the sheath material) is determined by its displacement current (dielectric loss). Air is also a good insulator and for most practical purposes has no displacement current.

When more than one dielectric material is stacked between conductors, the capacitance is the same as the capacitance of each material connected in series. The capacitance of the insulating sheath 350 is in series with the capacitance of the water. When two materials are placed side-by-side between conductors, the capacitance is the same as the capacitance of each material connected in parallel. In the embodiment of the measurement gage 310 shown in FIG. 3b, the capacitance of the section filled with water is in parallel with the capacitance of the section filled with air (e.g., above the water level).

Figure 3C:
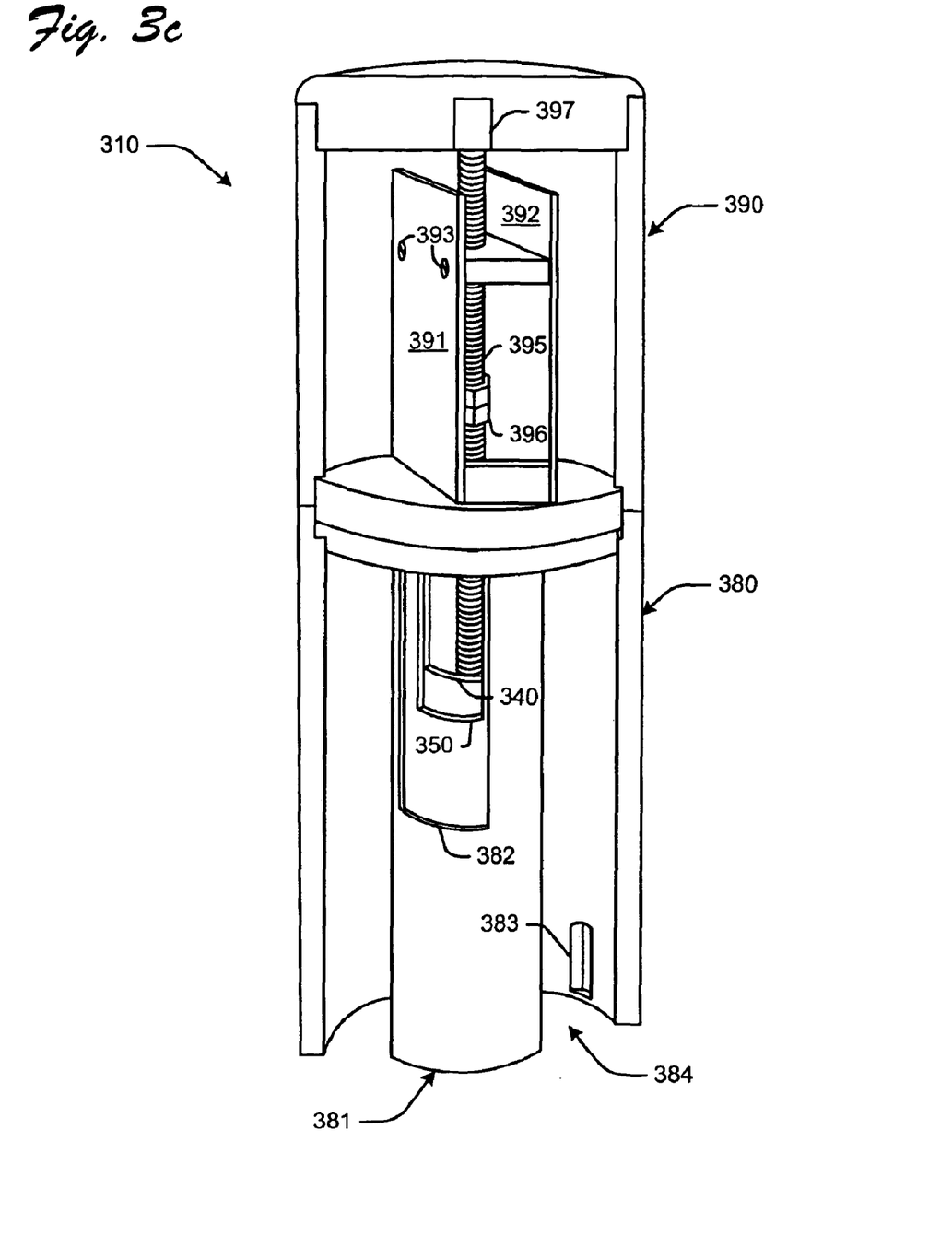
FIG. 3c is a cut-away perspective view of an exemplary water measurement apparatus.

FIG. 3c is a cutaway perspective view of an exemplary water height measurement apparatus showing the measurement gage 310 in more detail. The measurement gage may include a base portion 380 and a top portion 390. Base portion 380 may house the measurement capacitor 381. Measurement capacitor 381 may include an outer gage electrode 382 surrounding insulating sheath 350 and inner conductor 340. One or more openings 383 are formed in the outer conductor 360 to allow water to enter an integral stilling well 384 formed as part of the base portion 380 between the measurement capacitor 381 and the outer conductor 360.

Top portion 390 may house the circuitry, such as, e.g., a transceiver and battery board 391 and a measurement board 392. The circuit boards 391, 392 may be mounted in the top portion 390, e.g., by fasteners 393. Electrical connections (not shown) may also be provided between the circuit boards 391, 392 and the measurement capacitor 381 in base portion 380. The top portion 390 may be mounted to the bottom portion 380, e.g., by a threaded rod 395 using nuts 396 and compression fitting 397.

Figure 4:
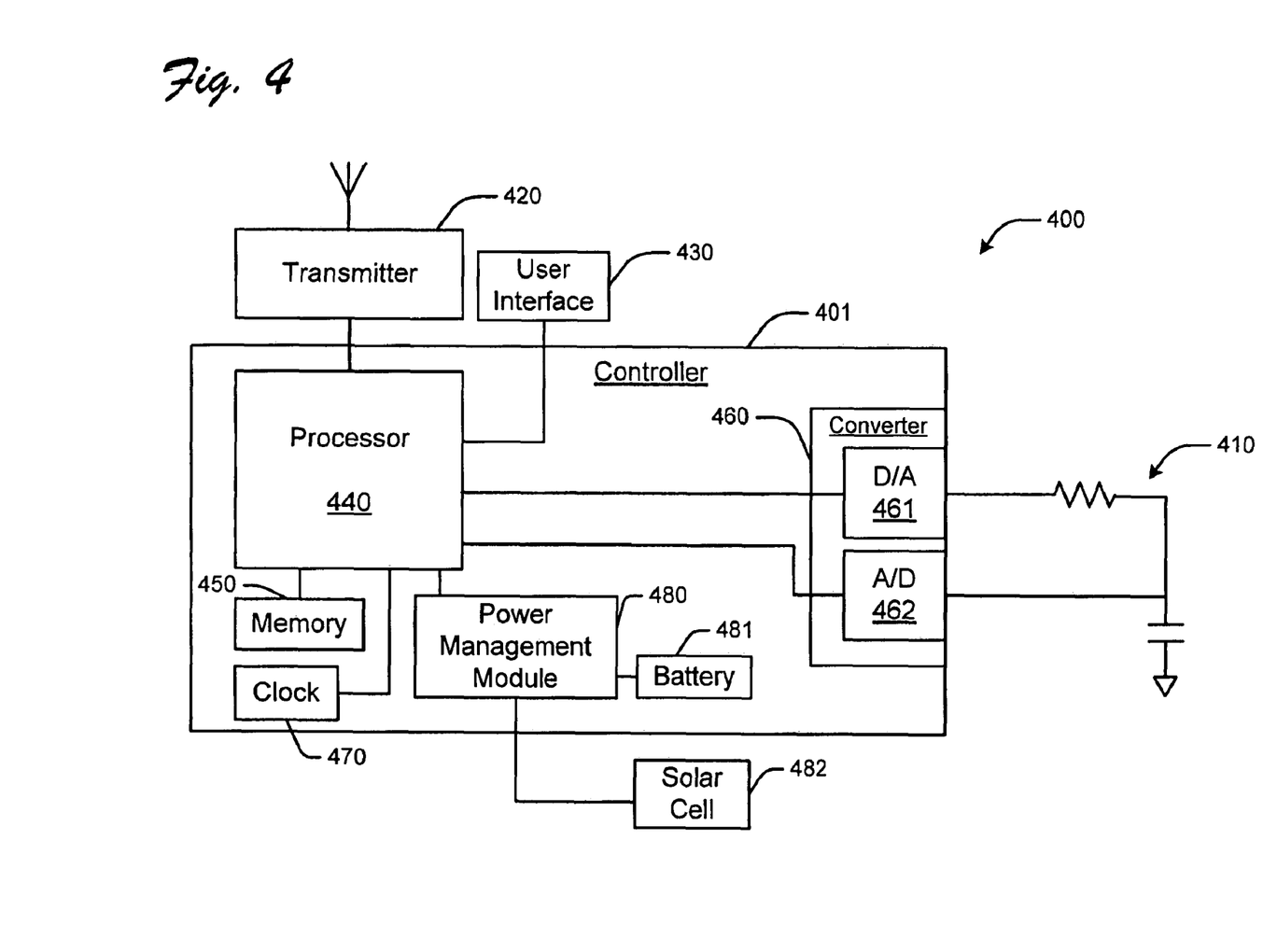
FIG. 4 is a functional block diagram illustrating an exemplary implementation of control circuitry.

FIG. 4 is a functional block diagram illustrating exemplary control circuitry 400 that may be used to implement a water measurement apparatus. Control circuitry 400 may be provided, e.g., on a computer board 401 mounted in a protective housing to the water measurement apparatus (e.g., as illustrated in an exemplary implementation in FIG. 3c).

Control circuitry 400 is operatively associated with a gage or measurement circuit 410, discussed in more detail below. Control circuitry 400 may also be operatively associated with an optional transmitter 420 (e.g., RF transmitter) for remote data and program management (e.g., in the auto-network of FIG. 1). An optional user interface 430 (e.g., an interactive display implemented with an LCD) may also be provided.

Control circuitry 400 includes one or more processor 440 (or processing units), and computer-readable storage or memory 450 (e.g., Flash memory). Memory 450 may be used, for example, to store water level data (e.g., water height measurements). Processor is operatively associated with the measurement gauge 410, e.g., via converter 460 including a digital to analog (D/A) converter 461 and analog to digital (A/D) converter 462.

Control circuitry 400 also includes computer-readable program code for implementing operations on the processor 440. In an exemplary implementation, program code is provided for managing the application of the signal (e.g., sin wave) from the D/A converter 461, the measurement with the A/D converter 462, and storing water level data.

Program code is also provided for operations on the water level data using a Discrete Fourier Transform (DFT) algorithm, computing real and imaginary values of the gage measurement with respect to the phase of the input, and determining the capacitance based on the voltage measurement. These operations for determining the water height based at least in part on the measured voltage are described in more detail below. Optional program code may also be provided for determining the flow rate (e.g., over a weir) and/or the total volume of water (e.g., in a reservoir) based on one or more water height measurements.

In one embodiment, the program code may be implemented as scripts. Embodiments for controlling a device using scripts are described in co-pending, co-owned U.S. patent application entitled "DISTRIBUTED CONTROL SYSTEMS AND METHODS FOR BUILDING AUTOMATION" of Hesse, et al., filed on Apr. 24, 2003 (Ser. No. 10/422,525), which is hereby incorporated herein by reference for all that it discloses. The scripts may be defined based on various parameters, such as the needs and desires of those responsible for monitoring the water. The scripts can also be reconfigured based on the changing needs and/or desires of those responsible for monitoring the water.

Control circuitry 400 may also include a clock 470 (e.g., a battery-backed, real-time clock). Clock 470 may be used to record the time of a water height measurement. Clock 470 may also be used to initiate measurements and/or implement a timing schedule, such as the timing diagram illustrated in FIG. 2 for auto-networking.

Control circuitry 400 may also include a power management module 480 operatively associated with one or more power sources, such as, e.g., battery 481 and solar cell 482.

Exemplary Operations:

Briefly, the complex measurement method involves solving simultaneous equations for capacitance and resistance using the real and imaginary voltages. The real and imaginary voltage measurements are passed through a discrete Fourier Transform (DFT). The sine wave is smoothed by gage capacitance. The measurement shows real and imaginary values that are about equal. The result is independent of salinity and other factors affecting conduction current.

Temperature dependence may be reduced using a Teflon sleeve. The sensitivity of capacitance ($C_t$) may be determined as follows, where the thickness of the Teflon sleeve is chosen to determine S.

$$C_t = \frac{C_{water} C_{sheath}}{C_{water} + C_{sheath}}$$

and $$S = \frac{C_{sheath}}{C_{water} + C_{sheath}}$$

Where $C_{sheath}$ for Teflon is 43.9 pF/in and $C_{water}$ is 322.2 pF/in. Accordingly, S is 0.1199. The remaining variation may be compensated with an optional temperature sensor inside the inner tube.

The effects of residual deposits may also be reduced. Under the water, residual deposits have a much smaller dielectric constant than that of water and the effects on accuracy are negligible. Above water, the volume of water contributes to capacitance. Therefore, surface wetting effects on accuracy are negligible.

The following equations illustrate exemplary operations to implement a water measurement apparatus (such as the water measurement apparatus 300 shown in FIGS. 3a and 3b). In one embodiment, the operations may be implemented by control circuitry, such as the control circuitry 400 shown in FIG. 4.

Figure 5:
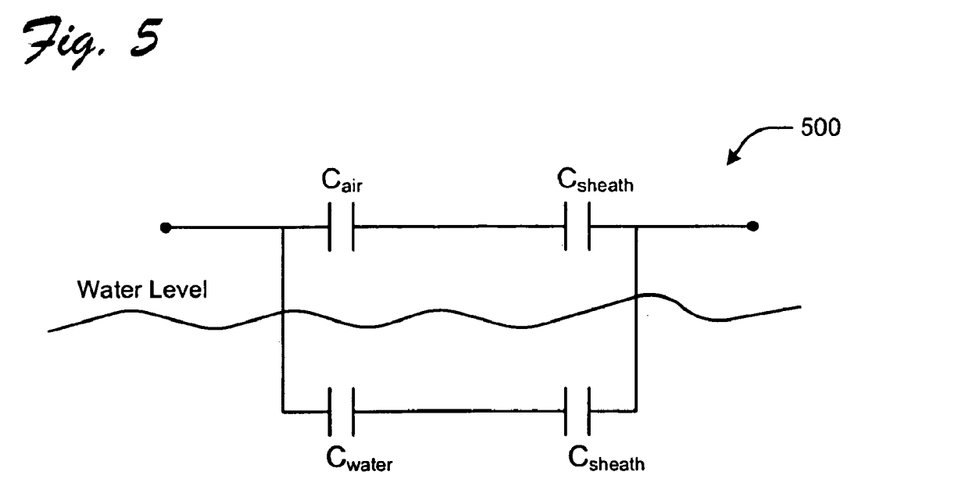
FIGS. 5–8 are circuit diagrams that may be used to implement an exemplary water measurement apparatus.

A measurement circuit (e.g., gage 410 in FIG. 4) may be modeled according to one implementation by circuit 500 shown in FIG. 5 The total gage capacitance for circuit 500 is defined by equation (1):

$$C_{gage} = \frac{C_{water}C_{sheath}}{C_{water} + C_{sheath}} + \frac{C_{air}C_{sheath}}{C_{air} + C_{sheath}} \quad (EQ\ 1)$$

When $C_{water}$ is much larger than $C_{sheath}$ the series capacitance is dominated by $C_{sheath}$. Also note that the capacitance of the empty section is dominated by $C_{air}$.

Figure 6:
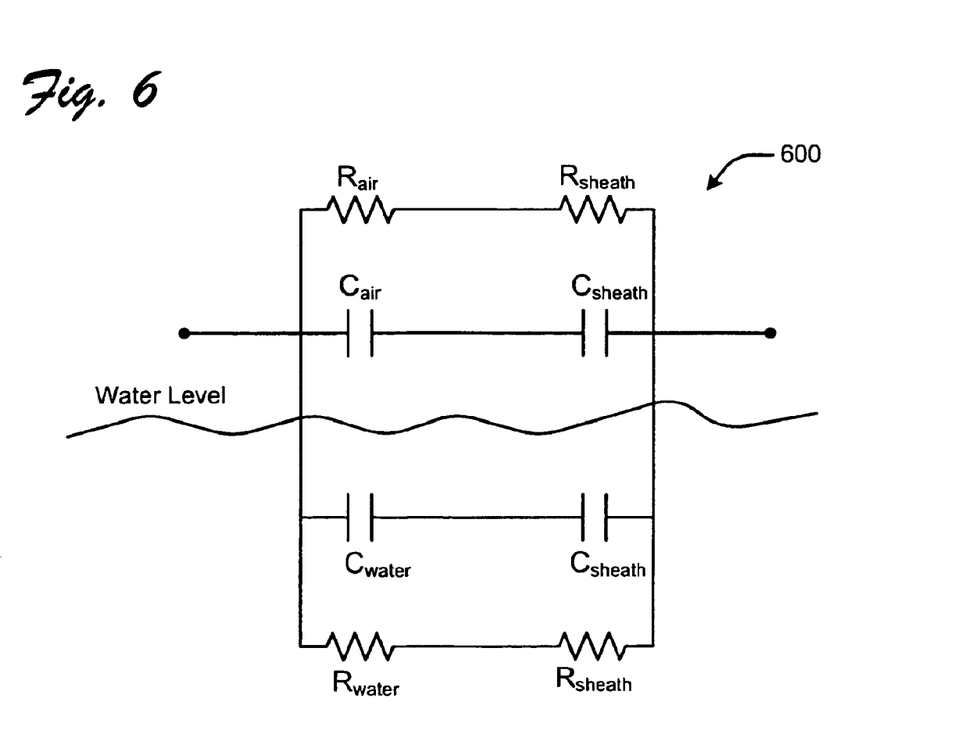

The gage capacitance may be corrected for temperature and salinity, as modeled in FIG. 6 by circuit 600. With regard to temperature, the dielectric constant of water is about 78.5 at room temperature and varies from about 85 near freezing to about 56 near the boiling point. The measured capacitance depends on the temperature of the water. However, if the geometries of the insulating sheath and the space that fills with water are chosen so that $C_{water}$ is much greater than $C_{sheath}$ and the empty space such that $C_{air}$ is much less than $C_{sheath}$, the measured value of capacitance depends primarily upon the characteristics of $C_{sheath}$. It should be noted that the temperature need not be measured to compensate for its effect when a stable material (e.g., Teflon) is used for the sheath.

The conductivity of the water also varies with salinity. The measurement method is preferably insensitive to changes in $R_{water}$. Measurement techniques may be employed to separate resistance and capacitance in parallel, such as, e.g., those known in analog in-circuit testing.

The gage capacitance may also be corrected for conductivity and salinity of the water. The water also has a loss component in parallel (whether by conduction current, displacement current, or both) with the dielectric.

Figure 7:
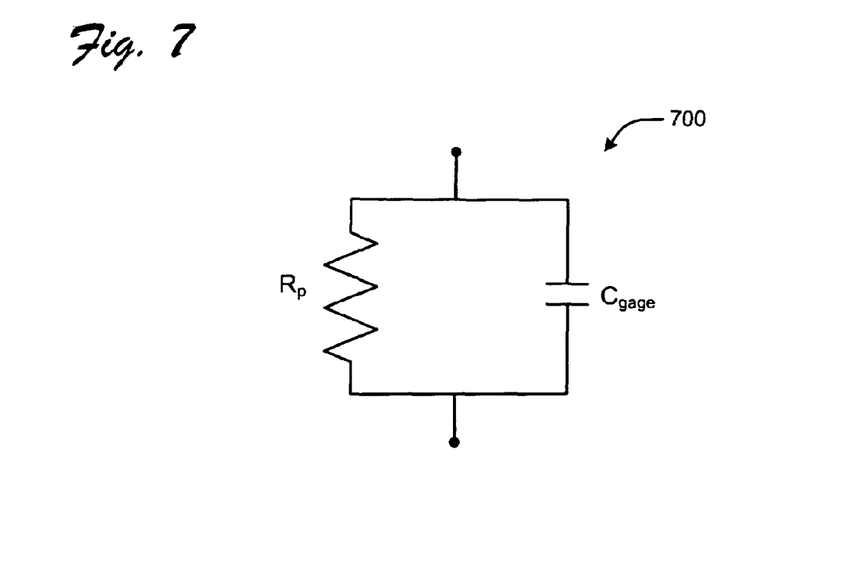
Figure 8:
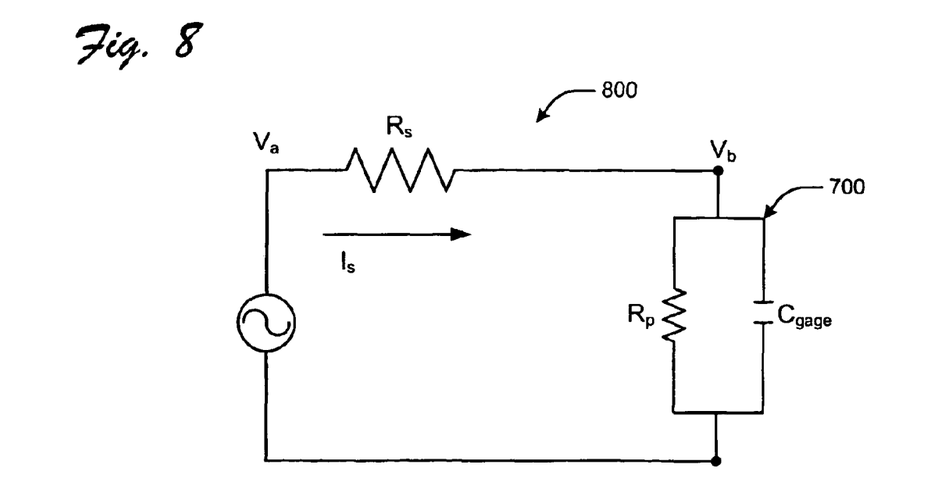

The gage may be modeled using the equivalent capacitance and dielectric loss, as shown by circuit 700 in FIG. 7. The circuit 700 is connected into a circuit 800 shown in FIG. 8 to measure voltage. The voltage, $V_b$, is (by direct circuit analysis):

$$V_b = \frac{R_p + \frac{1}{j\omega C_{gage}}}{R_p + \frac{1}{j\omega C_{gage}}}(I_s) \quad (EQ\ 2)$$

Where $$I_s = \frac{V_a - V_b}{R_s}$$

Expanding equation 2, the real component and the imaginary component of this equation form another system of equations which can be directly solved for the gage capacitance and parallel resistance. The solution for gage capacitance is:

$$C_{gage} = \frac{-\text{Im}\{V_b\}V_a}{\omega R_s((\text{Re}\{V_b\})^2 + (\text{Im}\{V_b\})^2)} \quad (EQ\ 3)$$

The solution for parallel resistance is:

$$R_p = \frac{-((\text{Re}\{V_b\})^2 + (\text{Im}\{V_b\})^2)R_s}{(\text{Re}\{V_b\})^2 - \text{Re}\{V_b\}V_a + (\text{Im}\{V_b\})^2} \quad (EQ\ 4)$$

The results are readily checked in Matlab as follows:

% Script to check derivation

% Define component values

Rs = 10000;

Rp = 1000;

Cgage = 22-e-12;

Va = 5;

F = 10000;

% Compute the impedance of R in parallel with Cgage

W = 2*pi*f;

Xcp = 1/(j*w*Cgage);

Zp = Rp*Xcp/(Rp+Xcp);

% Compute the voltage Vb

Vb = (Zp/(Rs+Zp))*Va

% Find the real and imag values of Vb v1 = real(Vb);

v2 = imag(Vb);

% Compute Cgage from measured voltages

Cgage_meas = -Va*v2/(w*Rs*(v1^2 + v2^2))

% Compute Rp from measured voltages

Rp_meas = -(v1^2 + v2^2)*Rs/(v1^2 - Va*v1 + v2^2)

For a gage capacitance of 220 pF, a source resistance of 10K, and a parallel resistance of 10K, and a frequency of 10 KHz checks as:

Vb = 0.4545 − 0.0057i

Cgage_meas = 2.2000$e^{-010}$

Rp_meas = 1.0000$e^{+003}$

Changing the frequency to 1 KHz results in a more reasonable value of $V_b$ but produces no other changes. Similar results were produced by varying the other parameters.

The discrete Fourier transform of a signal (DFT) is defined as:

$$V(k\Delta\omega) = \frac{j\sqrt{2}}{N}\sum_{n=0}^{N-1}V(n)e^{\frac{-j2\pi nk}{N}} \quad (EQ\ 5)$$

Where N is the number of samples of the waveform and delta ω is the change in radian frequency. If the time between samples is delta t, the change in radian frequency is defined as:

$$\Delta\omega = \frac{1}{N\Delta t} \quad \text{(EQ 6)}$$

The actual radian frequency is:

$$\omega = k\Delta\omega = \frac{k}{N\Delta t} \quad \text{(EQ 7)}$$

The integer k is chosen so that omega ($\omega$) is the desired frequency.

Exemplary Calculation

The parameters for the check solution are defined as:

% Define the parameters $N = 100$;

delta $T = 1.12e^{-4}$ amplitude = 1;

*phaseAngle* = 45;

approx_freq = 1000;

Here N is the number of samples, deltaT is the time between samples, amplitude is the RMS value of the voltage, phaseAngle is the phase angle of the signal with respect to a sine wave, and approx_frequency is the target frequency. The actual frequency is the nearest integer frequency (because of deltaT) to the target frequency.

The vector of times and the actual frequency is determined by:

% Computer the time vector $T = 0$; delta $T$; (*Nsamples* − 1) ∗ delta $T$;

$K = \text{round}(F / deltaF)$;

Freq = $k * deltaF$;

The signal (as a function of time) is computed by:

% Compute the time varying voltage vector v = sqrt(2) ∗ amplitude ∗ sin(2 ∗ pi ∗ Freq ∗ $t$ + pi ∗ *phaseAngle* / 180);

The discrete fourier transform (DFT) of the signal is computed by:

% Computes the discrete fourier transform at one frequency $n = 0; N-1$;

Vac = sqrt(2) ∗ $j * v * \exp(j * 2 * pi * k * n / N)N$;

Note that in Matlab, v is a row vector and exp (j*2*pi*k*n/N)' is a column vector. When these two quantities are multiplied together, the result is the sum of the product of the elements.

The real and imaginary values are equal and positive (as we expect them to be at a 45 degree angle). The magnitude of the voltage (sqrt(Vreal^2+Vimag^2)) is equal to 1 which was the value set.

Figure 9:
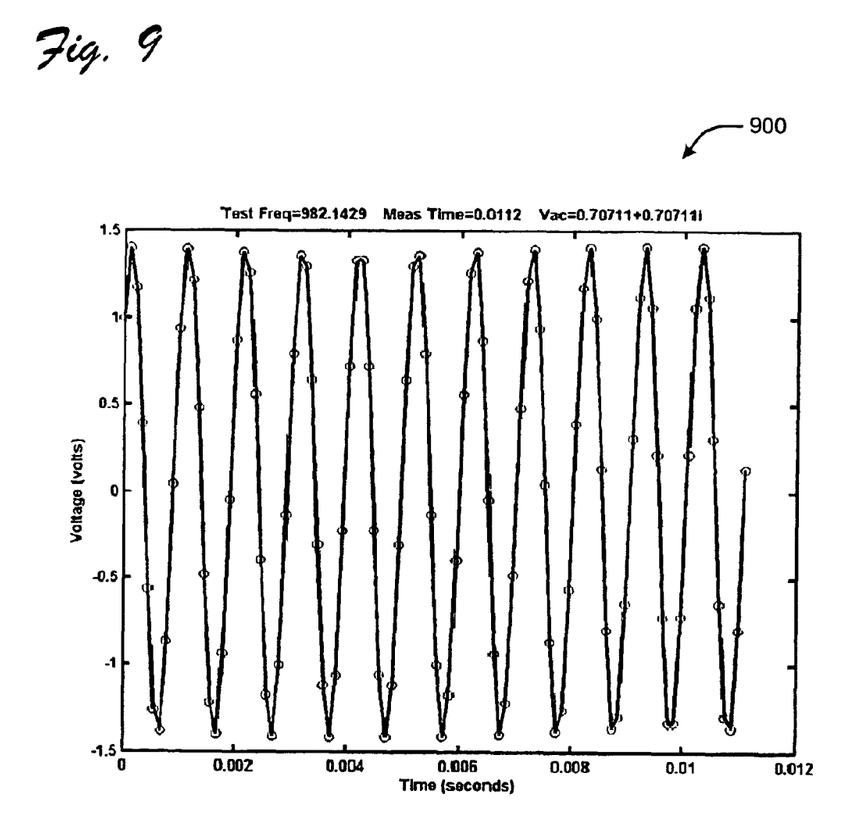
FIG. 9 is a plot of a waveform showing sample points during operation of an exemplary water measurement apparatus.

FIG. 9 is a waveform showing sample points during operation of an exemplary water measurement apparatus.

Note that there are multiple cycles of the input waveform sampled. The data for the D/A contains all the points shown as circles.

For computational convenience, the real and imaginary values can be separately computed by noting that:

$$V(k\Delta\omega) = \frac{j\sqrt{2}}{N}\sum_{n=0}^{N-1} V(n)e^{\frac{-j2\pi nk}{N}} \quad \text{(EQ 8)}$$

$$= \frac{j\sqrt{2}}{N}\sum_{n=0}^{N-1} V(n)\left(\cos\left(\frac{2\pi nk}{N}\right) + j\sin\left(\frac{2\pi nk}{N}\right)\right)$$

$$= \frac{\sqrt{2}}{N}\sum_{n=0}^{N-1} V(n)\left(j\cos\left(\frac{2\pi nk}{N}\right) - \sin\left(\frac{2\pi nk}{N}\right)\right)$$

OR $$V(k\Delta\omega) = \frac{-\sqrt{2}}{N}\sum_{n=0}^{N-1} V(n)\sin\left(\frac{2\pi nk}{N}\right) + \quad \text{(EQ 9)}$$

$$j\frac{\sqrt{2}}{N}\sum_{n=0}^{N-1} V(n)\cos\left(\frac{2\pi nk}{N}\right)$$

Exemplary Design Parameters

The empty value of capacitance is:

Design Inputs:

Dielectric constants:

$\varepsilon_0 := 8.854 * 10^{-12}$ farad/m $\varepsilon_{water} := 78.54$ $\varepsilon_{pvc} := 4.5$ $\varepsilon_{air} := 1$ Outside diameter of the inner conductor:

$r_{ic} := \frac{0.875}{2}$ in

Inside diameter of the outer conductor:

$r_{oc} := \frac{1.500}{2}$ in

Inside diameter of the *PVC* pipe:

$r_{ipvc} := \frac{0.930}{2}$ in

Outside diameter of the *PVC* pipe:

$r_{opvc} := \frac{1.050}{2}$ in

Length of the gage:

$L := 22$ in

The capacitance for a gage height H is:

Height of water in gage: $H \equiv 0.0001$ inch $C_{gage} = 6.992 \times 10^{-11} F$ The full scale value of capacitance is:

Design Inputs:

-continued

Dielectric constants:

$\varepsilon_0 := 8.854 * 10^{-12}$ farad/m $\varepsilon_{water} := 78.54$ $\varepsilon_{pvc} := 4.5$ $\varepsilon_{air} := 1$ Outside diameter of the inner conductor:

$r_{ic} := \frac{0.875}{2}$ in

Inside diameter of the outer conductor:

$r_{oc} := \frac{1.500}{2}$ in

Inside diameter of the PVC pipe:

$r_{ipvc} := \frac{0.930}{2}$ in

Outside diameter of the PVC pipe:

$r_{opvc} := \frac{1.050}{2}$ in

Length of the gage:

$L := 22$ in

The capacitance for a gage height H is:

Height of water in gage: $H \equiv 18$ inches $C_{gage} = 2.878 \times 10^{-10} F$ It is readily apparent that the water measurement apparatus and methods of the present invention represent important developments in the field of water monitoring. Having herein set forth exemplary implementations, it is anticipated that suitable modifications can be made thereto which will nonetheless remain within the scope of the invention.

What is claimed is:

1. An auto-network of water measurement stations comprising:
   at least a first and second water measurement station;
   a capacitive water measurement device at the first water measurement station, the capacitive water measurement device determining a water level at the first water measurement station from a capacitance value based on a measured voltage; and
   a transmitter at the first water measurement station operatively associated with a receiver at the second water measurement station, the transmitter delivering water measurement data based on the water level to the receiver at the second measurement station.

2. The auto-network of water measurement stations of claim 1 wherein the water measurement data includes the water level and a corresponding sample time.

3. The auto-network of water measurement stations of claim 1 wherein at least the first measurement station toggles between an active state and an inactive state to conserve power.

4. The auto-network of water measurement stations of claim 1 wherein the first and second measurement stations toggle between an active state and an inactive state, the active state of the first measurement station overlapping in time with the active state of the second measurement station.

5. The auto-network of water measurement stations of claim 1 wherein the capacitive measurement device includes a measurement circuit outputting a voltage corresponding to the water level.

6. The auto-network of water measurement stations of claim 1 wherein the capacitive measurement device includes a processor executing computer readable program code including program code for determining the water level based on a measured voltage.

7. The auto-network of water measurement stations of claim 1 wherein the capacitive measurement device includes a measurement circuit outputting a voltage corresponding to the water level.

8. A method comprising:
   measuring a voltage between an inner conductor and an outer conductor;
   separating a real component and an imaginary component of the measured voltage;
   converting the measured voltage to a capacitance value using the real and imaginary component of the measured voltage; and
   determining the water level based on the capacitance value.

9. The method of claim 8 further comprising determining a flow rate based on the capacitance value.

10. The method of claim 8 further comprising determining a volume of water based oil the capacitance value.

11. The method of claim 8 wherein the capacitance value changes in proportion to changes in the water height between the inner conductor and the outer conductor.

12. The method of claim 8 further comprising recording the water level and a corresponding sample time.

13. The method of claim 8 further comprising transmitting water measurement data including at least the water level in an auto-network of water measurement stations.

14. A water measurement apparatus comprising:
   a measurement circuit outputting a voltage;
   a processor operatively associated with the measurement circuit to receive the voltage and determine a capacitance value proportional to a water level; and
   computer readable program code provided in computer readable storage and executable by the processor, the computer readable program code including:
   program code for determining a real component and an imaginary component of the voltage; and
   program code for determining the water level based on the capacitance value.

15. The water measurement apparatus of claim 14 wherein the measurement circuit includes an inner conductor and an outer conductor.

16. The water measurement apparatus of claim 15 wherein the inner conductor is surrounded by an insulating sheath.

17. The water measurement apparatus of claim 15 wherein the voltage is measured between the inner conductor and the outer conductor.

18. The water measurement apparatus of claim 15 wherein the capacitance value changes in proportion to the water height between the inner conductor and the outer conductor as indicated by the voltage.

19. The water measurement apparatus of claim 14 further comprising program code for correcting the capacitance value for water conductivity.

20. The water measurement apparatus of claim 14 further comprising program code for correcting the capacitance value for water temperature.

21. The water measurement apparatus of claim 14 further comprising program code for correcting the capacitance value for water salinity.

22. The water measurement apparatus of claim 14 further comprising recording the water level and a corresponding sample time in the computer readable storage.

23. The water measurement apparatus of claim 14 further comprising a transmitter at a first station operatively associated with a receiver at a second station to deliver water measurement data including at least the water level from the first station to the second station.

24. The water measurement apparatus of claim 23 wherein the transmitter and the receiver are auto-networked with one another.

25. A water measurement apparatus comprising:

a measurement circuit outputting a voltage;

a processor operatively associated with the measurement circuit to receive the voltage and determine a capacitance value proportional to a water level; and computer readable program code provided in computer readable storage and executable by the processor, the computer readable program code including program code for determining the water level based on the capacitance value; and a transmitter at a first station operatively associated with a receiver at a second station to deliver water measurement data including at least the water level from the first station to the second station.

26. The water measurement apparatus of claim 25 wherein the measurement circuit includes an inner conductor and an outer conductor.

27. The water measurement apparatus of claim 26 wherein the inner conductor is surrounded by an insulating sheath.

28. The water measurement apparatus of claim 26 wherein the voltage is measured between the inner conductor and the outer conductor.

29. The water measurement apparatus of claim 26 wherein the capacitance value changes in proportion to the water height between the inner conductor and the outer conductor as indicated by the voltage.

30. The water measurement apparatus of claim 25 wherein the computer readable program code includes program code for determining a real component and an imaginary component of the voltage.

31. The water measurement apparatus of claim 25 further comprising program code for correcting the capacitance value for water conductivity.

32. The water measurement apparatus of claim 25 further comprising program code for correcting the capacitance value for water temperature.

33. The water measurement apparatus of claim 25 further comprising program code For correcting the capacitance value For water salinity.

34. The water measurement apparatus of claim 25 further comprising recording the water level and a corresponding sample time in the computer readable storage.

35. The water measurement apparatus of claim 34 wherein the transmitter and the receiver are auto-networked with one another.

* * * * *

UNITED STATES PATENT AND TRADEMARK OFFICE
CERTIFICATE OF CORRECTION

PATENT NO.   : 6,925,398 B2
DATED        : August 2, 2005
INVENTOR(S)  : John McDermid It is certified that error appears in the above-identified patent and that said Letters Patent is hereby corrected as shown below:

Column 2,
Line 65, "by read it" should be -- by reading it --.

Column 3,
Line 4, "for routing" should be -- for routine --;
Lines 14-15, "can also be passed delivered" should be -- can also be delivered --;
Line 17, "is station is within" should be -- is stationed within --.

Column 4,
Line 52, "to where" should be -- where --.

Column 14,
Line 21, "For water salinity" should be -- for water salinity --.

Signed and Sealed this

Twenty-eighth Day of February, 2006

JON W. DUDAS
*Director of the United States Patent and Trademark Office*